US008297819B2

(12) United States Patent
Pfund et al.

(10) Patent No.: US 8,297,819 B2

(45) Date of Patent: Oct. 30, 2012

(54) LIGHT PIPE STRUCTURE AND LUMINAIRE WITH LIGHT PIPE STRUCTURE

(75) Inventors: David R. Pfund, Woodbridge, CT (US); Paul R. Ford, Orange, CT (US); Joseph Mancinelli, Weston, CT (US); Irving Schaffer, Fairfield, CT (US)

(73) Assignee: Sylvan R. Shemitz Designs Incorporated, West Haven, CT (US)

( * ) Notice: Subject to any disclaimer, the term of this patent is extended or adjusted under 35 U.S.C. 154(b) by 408 days.

(21) Appl. No.: 12/727,090

(22) Filed: Mar. 18, 2010

(65) Prior Publication Data

US 2010/0238679 A1 Sep. 23, 2010

Related U.S. Application Data

(60) Provisional application No. 61/161,835, filed on Mar. 20, 2009.

(51) Int. Cl.
*G02B 6/00* (2006.01)

(52) U.S. Cl. ......... 362/551; 362/556; 362/558; 362/628

(58) Field of Classification Search .................. 362/551, 362/556, 558, 628
See application file for complete search history.

(56) References Cited

U.S. PATENT DOCUMENTS

| | | | | |
|---|---|---|---|---|
| 5,207,498 | A | 5/1993 | Lawrence et al. | |
| 6,733,166 | B2 * | 5/2004 | Hulse | 362/551 |
| 7,443,591 | B1 * | 10/2008 | Cianciotto et al. | 359/618 |

* cited by examiner

*Primary Examiner* — Stephen F Husar
*Assistant Examiner* — James Cranson, Jr.
(74) *Attorney, Agent, or Firm* — Cantor Colburn LLP

(57) ABSTRACT

Disclosed is a light pipe structure configured for transmittal of light rays, the light pipe structure including a light entry end associated with a visible end via a light pipe body, the light entry end being configured for entrance of the light rays, and a depression disposed in a visible surface of the visible end, the depression being disposed substantially along a major axis of the visible surface.

21 Claims, 6 Drawing Sheets

LIGHT PIPE STRUCTURE AND LUMINAIRE WITH LIGHT PIPE STRUCTURE

CROSS-REFERENCE TO RELATED APPLICATION

This application is related to and claims the benefit of U.S. Provisional Patent Application Ser. No. 61/161,835 filed on Mar. 20, 2009, the entire contents of which are herein incorporated by reference.

FIELD

The disclosure relates generally to luminaire, and more particularly to a luminaire with a light pipe structure.

BACKGROUND

Light pipe structures are currently known to be disposed within luminaires in a manner that creates a luminous region at a relative side thereof. However, visible ends of these structures (i.e. the areas of the structures from which light exits) can be prone to undesirable concentrations of light at various regions of illumination viewable from an exterior of the luminaire. Secondary manufacturing processes designed to remedy this concentration are available, but can be costly and inefficient.

Accordingly, a light pipe structure configured to reduce undesirable intensity of light without requiring secondary manufacturing processes would be desirable.

SUMMARY

Disclosed is a light pipe structure configured for transmittal of light rays, the light pipe structure including a light entry end associated with a visible end via a light pipe body, the light entry end being configured for entrance of the light rays, and a depression disposed in a visible surface of the visible end, the depression being disposed substantially along a major axis of the visible surface.

Also disclosed is a light pipe structure configured for transmittal of light rays, the light pipe structure including a light entry end associated with a visible end via a light pipe body, the light entry end being configured for entrance of the light rays, a visible extension extending from the light pipe body at the visible end, and at least one angled surface disposed at a junction between the light pipe body and the visible end, the at least one angled surface being angled and disposed relative to the light pipe body to reflect at least a portion of the light rays transmitted by the light pipe structure off of a major axis of the light pipe body and into or in a direction of the visible extension.

Further disclosed is a luminaire configured for pipe lighting, the luminaire including a luminaire housing defining at least one light aperture and a light pipe aperture, at least one light source disposed in the luminaire housing, a light pipe structure at least partially disposed in an interior of the housing and extending to the light pipe aperture in a manner that renders a visible end of the light pipe structure visible from an exterior of the luminaire housing, the light pipe structure including a light entry end associated with the visible end via a light pipe body, wherein the light entry end is configured for entrance of light rays emanating from the light source, and a depression disposed in a visible surface of the visible end, the depression being disposed substantially along a major axis of the visible surface.

Still further disclosed is a luminaire configured for pipe lighting, the luminaire including a luminaire housing defining at least one light aperture and a light pipe aperture, at least one light source disposed in the luminaire housing, a light pipe structure at least partially disposed in an interior of the housing and extending to the light pipe aperture in a manner that renders a visible end of the light pipe structure visible from an exterior of the luminaire housing, the light pipe structure including a light entry end associated with the visible end via a light pipe body, wherein the light entry end is configured for entrance of light rays emanating from the light source, and at least one angled surface disposed at a junction between the light pipe body and the visible end, the at least one angled surface being angled and disposed relative to the light pipe body to reflect at least a portion of the light rays transmitted through light pipe body off of a major axis of the light pipe body and into or in a direction of the visible extension.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures.

DETAILED DESCRIPTION

Figure 1:
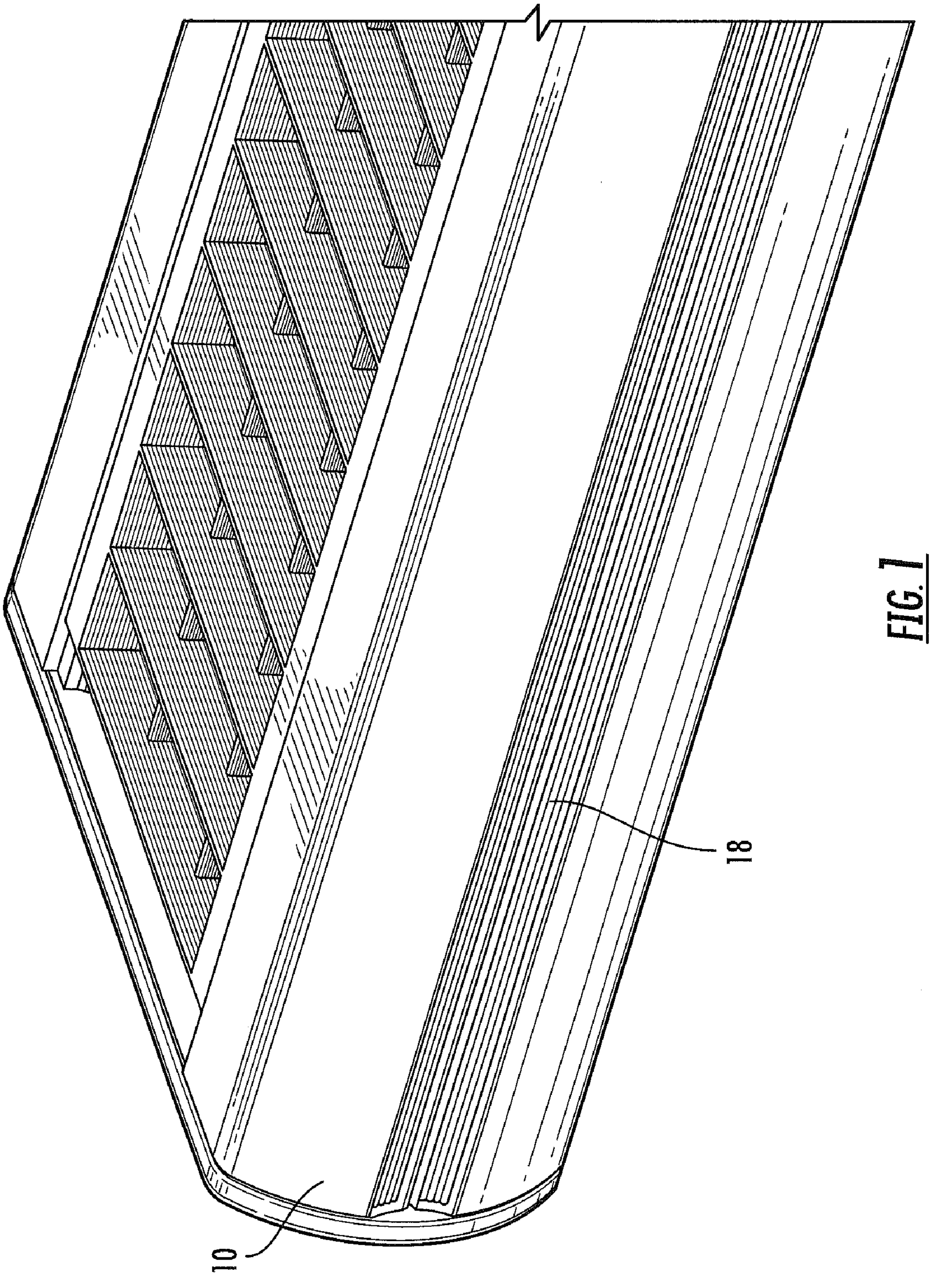
FIG. 1 is a partial upper perspective view of a luminaire including a light pipe structure in accordance with a first embodiment.
Figure 2:
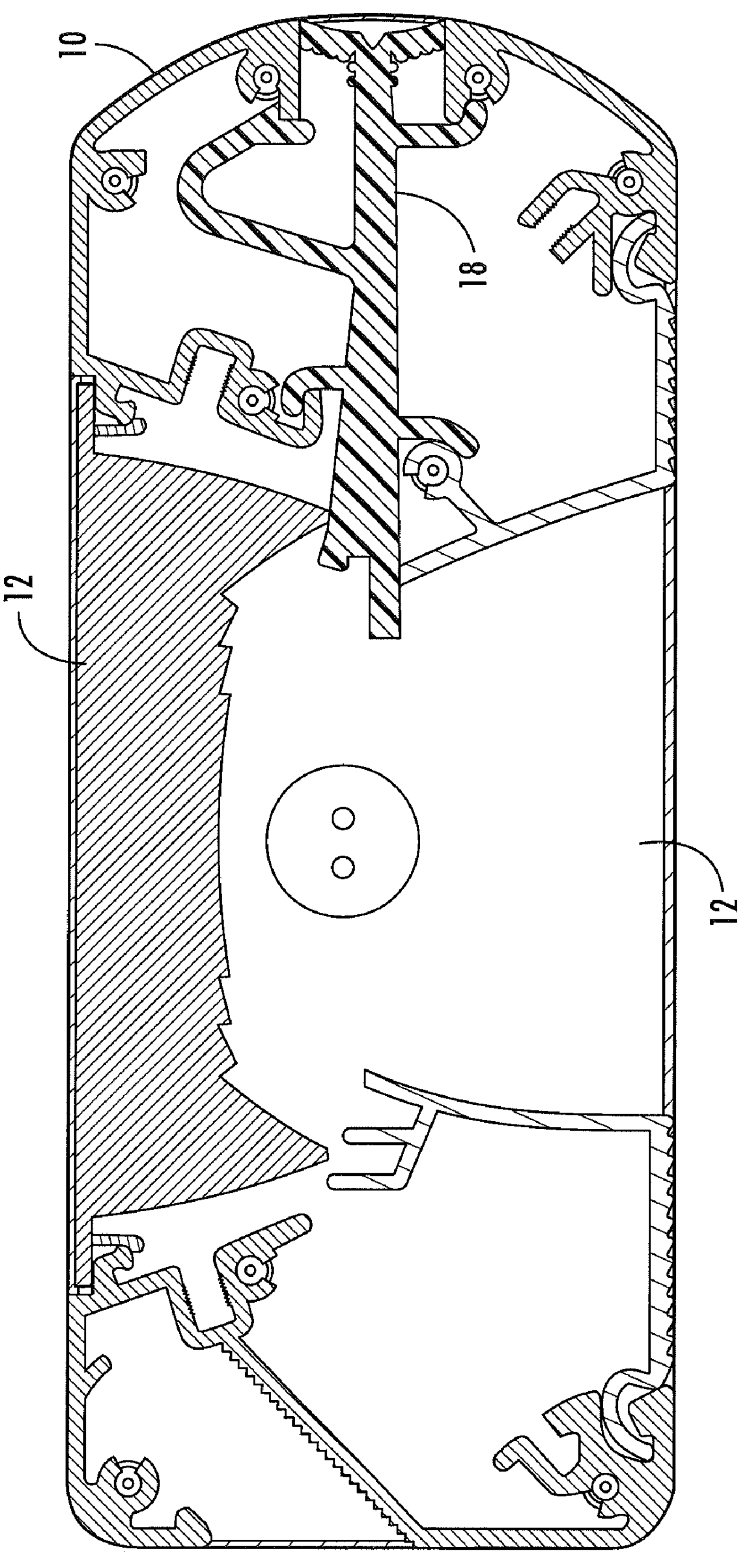
FIG. 2 is a schematic cross-sectional view of the luminaire and light pipe structure of FIG. 1.
Figure 3:
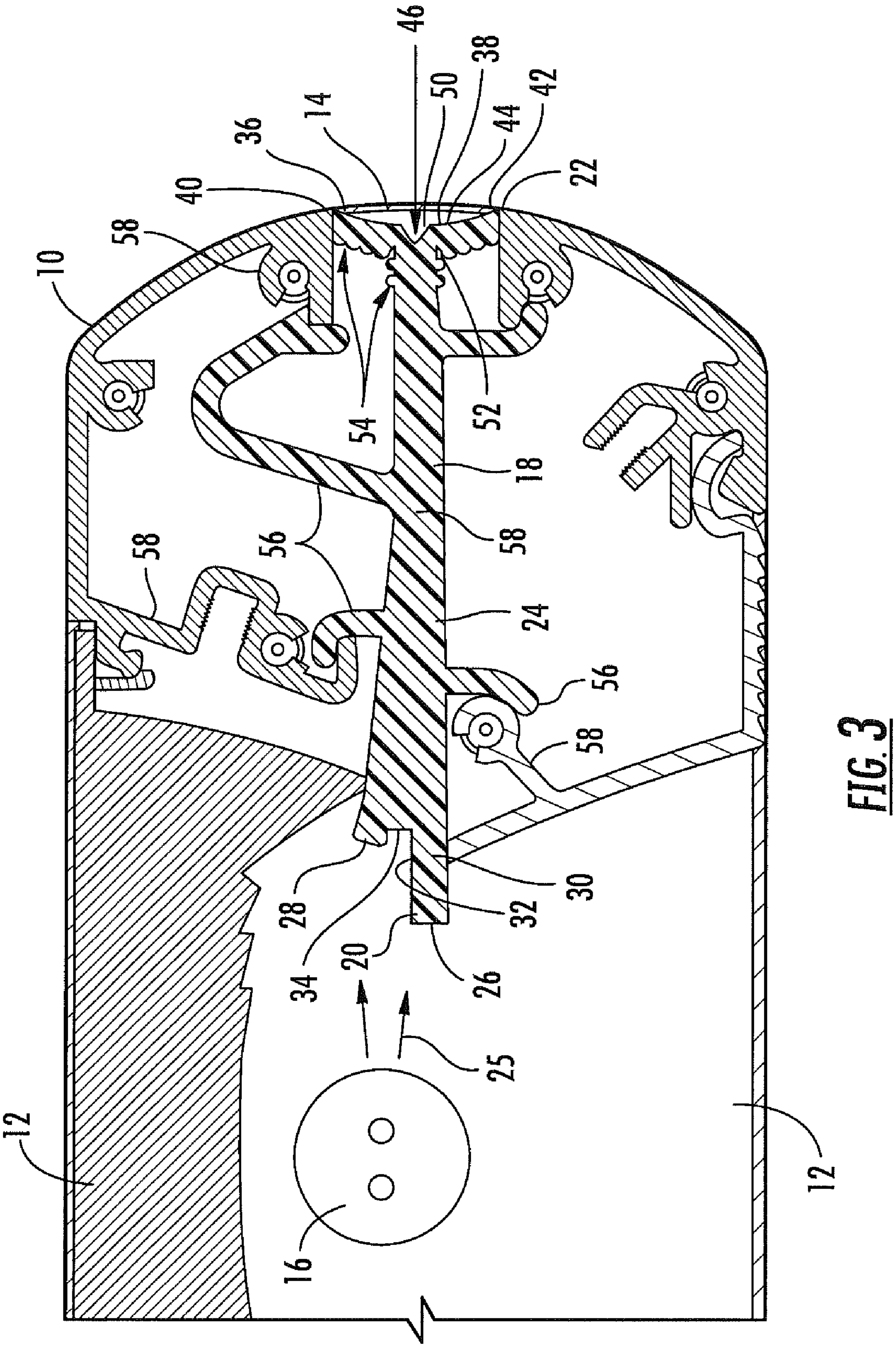
FIG. 3 is a partial schematic cross-sectional view of the luminaire and light pipe structure of FIG. 1.

With reference to FIGS. 1-3, a luminaire 10 configured for pipe lighting is illustrated. The luminaire 10 includes upper and lower light apertures 12 (which may be configured to house any known baffle assemblies) and a light pipe aperture 14. As is shown in the Figures, these apertures are disposed such that light will exit the housing in relatively perpendicular directions. The luminaire also includes at least one light source 16, such as a tubular lamp or a compact twin-tube lamp. Extending from an interior area of the housing 12 is a light pipe structure 18, which will be discussed in greater detail hereinbelow.

As is best shown in FIGS. 2 and 3, the light pipe structure 18 includes a light entry end 20 associated with a visible end 22 via a pipe body 24. An entirety of this pipe structure 18 may be constructed of light transmissive materials such as but not limited to plastic or glass. As is shown in the Figures, the light entry end 20 is disposed in closer proximity to the light source 16 than the visible end 22. This disposal obviously facilitates entry of light from the light source 16 at the light entry end 20.

As is shown in the exemplary embodiment of FIG. 3, light rays 25 from the light source 16 enters the pipe structure 18 at two distinct light entry surfaces 26 and 28. The first light entry surface 26 is disposed at the light entry end 20, and runs perpendicular to a relative horizontal axis or centerline 30 of the pipe body 24. On the other hand, the second light entry surface 28 is disposed at an angle to (i.e. not parallel or perpendicular to) the centerline 30. In addition, the first entry surface 26 in disposed in closer proximity to the light source 16 than the light entry surface 28. The distance between these entry surfaces combine with the angle at which they are disposed to define an accessory surface 32 and accessory notch 34 that are configured to associate the pipe structure 18 with luminaire accessories such as but not limited to lenses and modifiers.

As is discussed above, light enters the light pipe structure 18 at entry surfaces 26 and 28. Light then travels across the light transmissive body 24 to the visible end 22, which as shown in the Figures is clearly visible to a "user" from an exterior of the housing 12. This visible end 22 includes a relatively upper extension 36 and a relatively lower extension 38. In the exemplary embodiment of FIGS. 1-3, the pipe structure 18 is disposed such that the upper extension 36 abuts a relatively upper extent 40 of the light pipe aperture 14. Similarly, the lower extension 38 abuts an opposite, relatively lower extent 42 of the light pipe aperture 14 in this embodiment. Of course, though the Figures show outer points of the extensions 36 and 38 to lie flush with an exterior of the housing 12, it is well within the scope of this disclosure to dispose and/or configure the pipe structure 18 in manner that disposes these points beyond, or short of, the exterior of the housing 12.

Referring back to visibility of the visible end 22, it should be appreciated that the extensions 36 and 38 combine at their relative exterior sides to create a visible surface 44. This visible surface 44 defines a v-shaped cavity or depression 46 that delimits a separation point between the upper and lower extensions 36 and 38. In the exemplary embodiment of FIGS. 1-3, this notch 46 is disposed at a relative midpoint of the visible surface 44 between the relatively upper extent 40 of the light pipe aperture 44 and the relatively lower extent 42 of the light pipe aperture 14. As is shown the Figures, the notch 46 is also disposed along a major axis of the visible surface 44 (i.e. along a length extending towards the ends of the luminaire 10), and in alignment with the centerline 30 of the pipe body 24. More specifically, in the exemplary embodiment of FIGS. 1-3 an interior point 50 of the v-shaped notch 46 is disposed in direct alignment with the centerline 30. Aligning the interior point 50 with the centerline 30 aids in preventing an undesirable concentration of light at a throat junction 52 between the pipe body 24 and the visible end 22 (i.e. axial brightness).

Figure 3A:
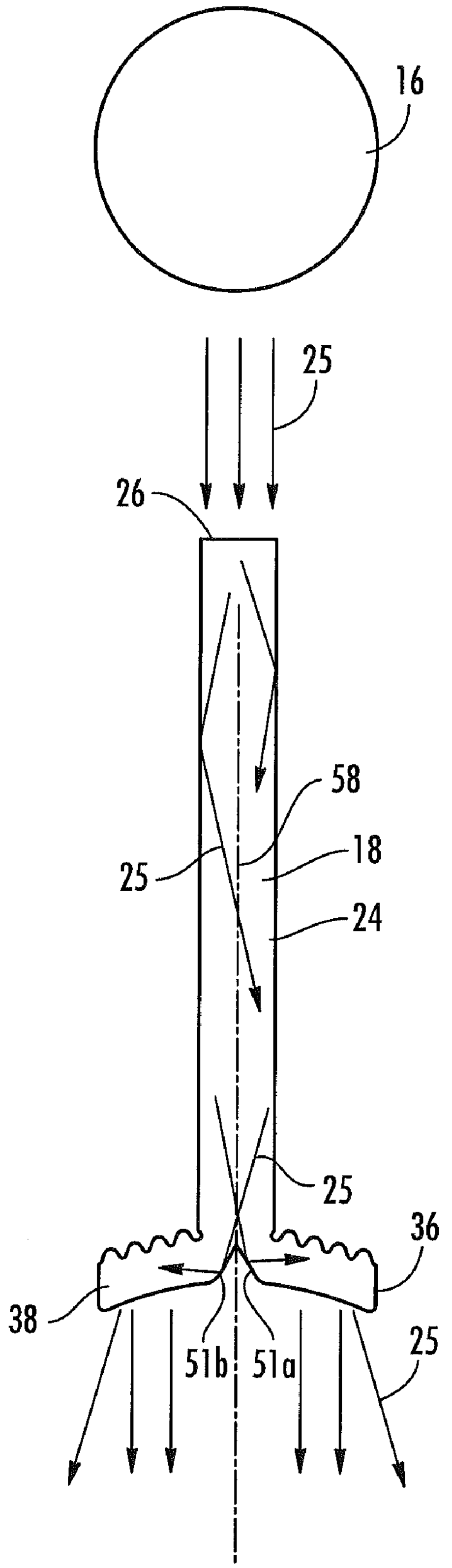
FIG. 3*a* is a partial schematic cross-sectional view of the light pipe structure of FIG. 1.

As shown in FIG. 3*a*, this prevention is accomplished via angling and disposal of depression surfaces or walls 51*a* and 51*b* (meeting at the interior point 50) relative to the light pipe body 24 and collimated light rays 25 traveling therethrough. These walls 51*a* and 51*b* act (at an interior of the pipe 18) to reflect at least a portion the collimated light rays 25 off of a major axis 58 of the light pipe body 24 and into, or in a direction of, extensions 36 and 38. It should be noted that, in the exemplary embodiment of FIGS. 3 and 3*a*, it may be beneficial for the extensions 36 and 38 to include a curved, visible surface profile, such as that shown in the Figure.

Referring now to the exemplary embodiment of FIG. 3 in particular, the visible end 22 and a portion of the pipe body 24 are illustrated to include rib structures 54. These rib structures 54 are disposed at interior surfaces 56 and 58 of the extensions 36 and 38 (the interior surfaces 56 and 58 being disposed opposite the visible surface 44) and along the pipe body 24 in proximity to the extensions 36 and 38. The notch 46 facilitates activation of these rib structures 54 when light is flowing therethrough, causing light rays to exit the relatively smooth visible surface 44 in a manner that creates a unique stepped highlight effect. These ribs act to extract or otherwise cause some of the light to exit in the same general direction as the collimated light but at a distance/offset from the projected dimension of the major axis 58 of the light pipe body 24. Of course, disposal of these ribbed structures 54 along the light pipe structure 18 renders any secondary etching or frosting processes to be unnecessary.

It should be appreciated that the light pipe structure 18 is associable with the luminaire housing 12 via association extensions 56 extending from the pipe body 24. As is shown in FIG. 3, these association extensions 56 are configured to engage with various internal luminaire flanges 58 in a manner that associates and supports the light pipe structure 18 within the luminaire housing 12.

Figure 4:
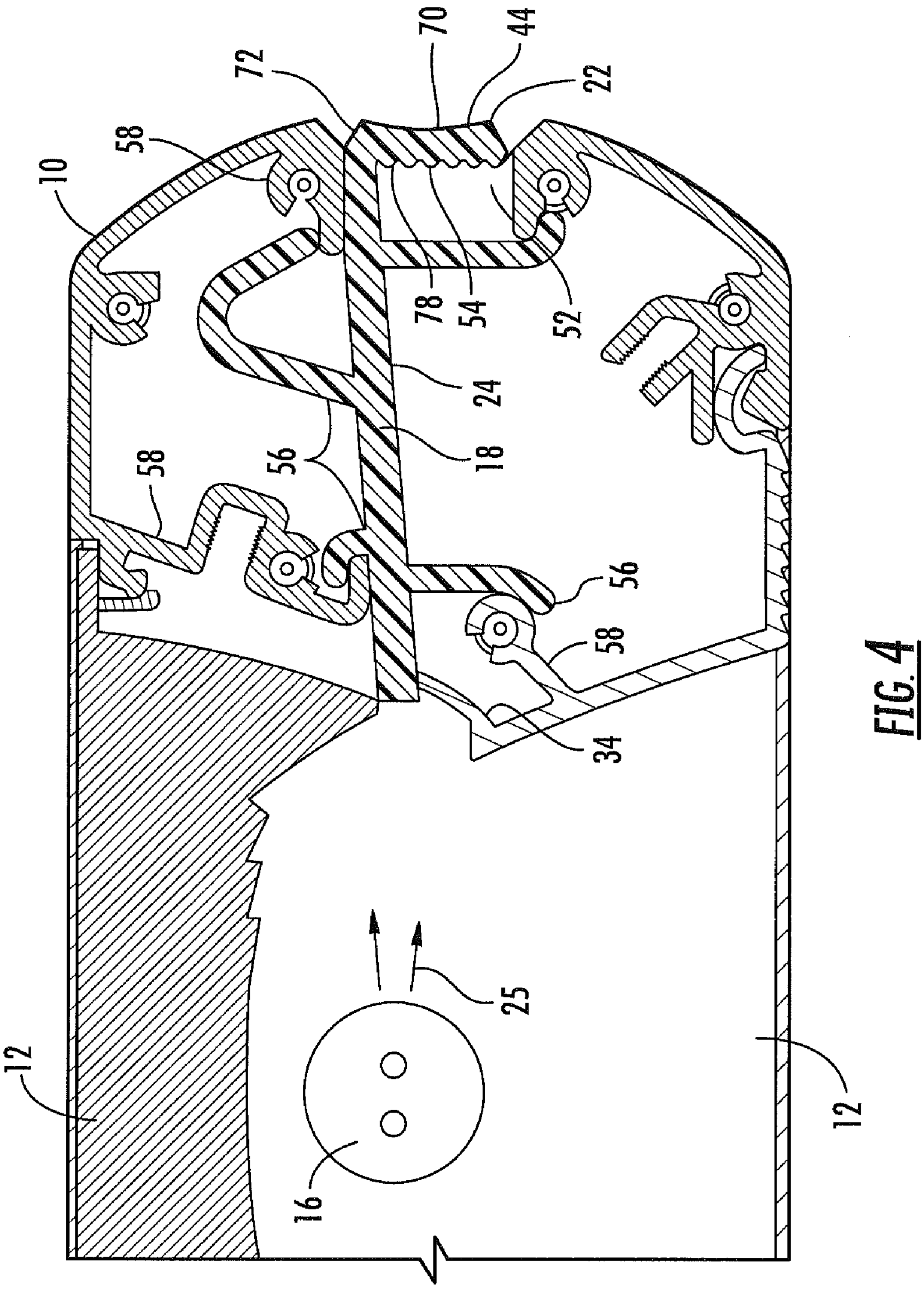
FIG. 4 is a schematic cross-sectional view of a luminaire including a light pipe structure in accordance with another embodiment.
Figure 4A:
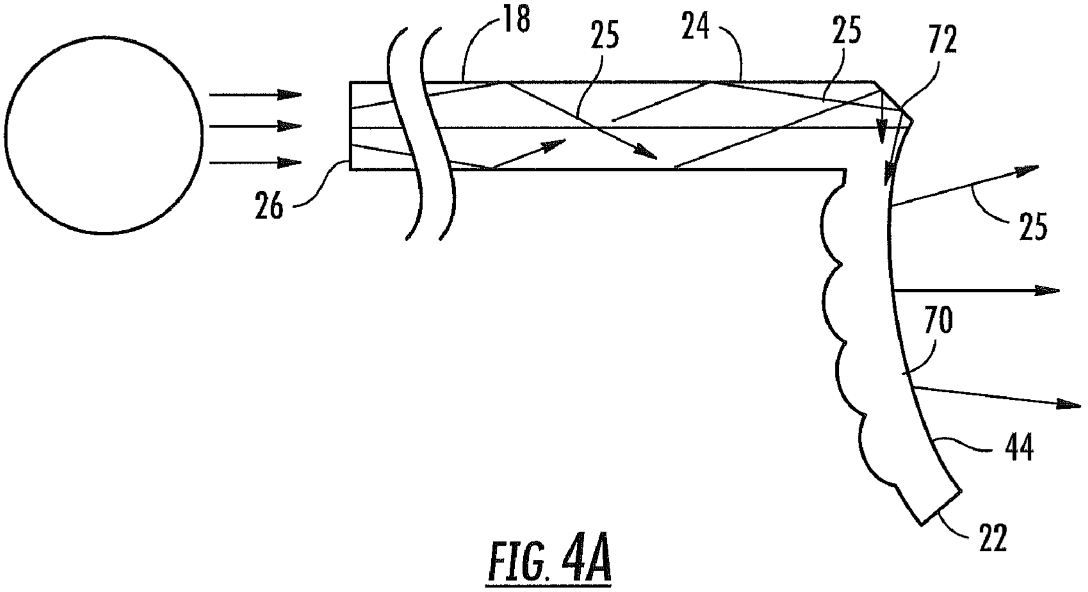
FIG. 4*a* is a partial schematic cross-sectional view of the light pipe structure of FIG. 4.

Referring now to FIGS. 4 and 4*a*, another embodiment of the light pipe 18 is illustrated, wherein like elements are numbered as set forth above. In this embodiment, a single extension 70 defines the visible surface 44, with an angled surface 72 being disposed at a junction between the light pipe body 24 and the extension 70. The angled surface 72 is disposed at an angle relative to the light pipe body 24 and collimated light rays 25 traveling therethrough. The angle is away from both parallel and perpendicular orientation relative to both the light pipe body 24 and extension 70 This surface 72 acts (at an interior of the pipe 18) to reflect at least a portion the collimated light rays 25 off of a major axis 58 of the light pipe body 24 and into, or in a direction of, extension 70. Similarly to the exemplary embodiment of FIG. 3, the structure 18 of FIG. 4 also includes rib structures 54 disposed at an interior surface 78 of the extension 70.

It will be apparent to those skilled in the art that, while exemplary embodiments have been shown and described, various modifications and variations can be made to the present apparatus and method disclosed herein without departing from the spirit or scope of the invention. Accordingly, it is to be understood that the various embodiments have been described by way of illustration and not limitation.

What is claimed is:

1. A light pipe structure configured for transmittal of light rays, the light pipe structure comprising:

a light entry end associated with a visible end via a light pipe body, said light entry end being configured for entrance of the light rays, and a depression disposed in a visible surface of said visible end, said depression being disposed substantially along a major axis of said visible surface.

2. The light pipe structure of claim 1, wherein said light pipe structure includes a first light entry surface and a second light entry surface that is distinct from said first light entry surface.

3. The light pipe structure of claim 2, wherein said first light entry surface and said second light entry surface are disposed at a lateral distance from each other, said distance combining with said angle of said second light entry surface to define an accessory surface and accessory notch.

4. The light pipe structure of claim 1, wherein said visible end of said light pipe structure includes a first extension and a second extension.

5. The light pipe structure of claim 4, wherein said first extension and said second extension define said visible surface, said depression being disposed in said visible surface and delimiting a separation point between said first extension and said second extension, wherein said depression includes at least one depression surface that is angled and disposed relative to said light pipe body and said first extension and said second extension to reflect at least a portion of the light rays transmitted by the light pipe structure off of a major axis of said light pipe body and into or in directions of said first extension and said second extension.

6. The light pipe structure of claim 1, wherein said depression disposed in said visible surface is a v-shaped depression.

7. The light pipe structure of claim 4, wherein said first extension and said second extension include a curved profile.

8. The light pipe structure of claim 4, wherein said first extension and said second extension include interior surfaces opposite said visible surface, said interior surfaces including rib structures.

9. The light pipe structure of claim 1, wherein an area of said light pipe body disposed in proximity to said visible end is ribbed.

10. The light pipe structure of claim 1, wherein at least a point of said cavity is disposed in alignment with said light pipe body.

11. A light pipe structure configured for transmittal of light rays, the light pipe structure comprising:

a light entry end associated with a visible end via a light pipe body, said light entry end being configured for entrance of the light rays, a visible extension extending from said light pipe body at said visible end; and at least one angled surface disposed at a junction between said light pipe body and said visible end, said at least one angled surface being angled and disposed relative to said light pipe body to reflect at least a portion of the light rays transmitted by the light pipe structure off of a major axis of said light pipe body and into or in a direction of said visible extension.

12. The light pipe structure of claim 11, wherein said light pipe structure includes a first light entry surface and a second light entry surface that is distinct from said first light entry surface.

13. The light pipe structure of claim 12, wherein said first light entry surface and said second light entry surface are disposed at a lateral distance from each other, said distance combining with said angle of said second light entry surface to define an accessory surface and accessory notch.

14. The light pipe structure of claim 11, wherein said visible extension defines a visible surface including a curved profile.

15. The light pipe structure of claim 14, wherein said visible extension includes an interior surface opposite said visible surface, said interior surface including rib structures.

16. The light pipe structure of claim 11, wherein an area of said light pipe body disposed in proximity to said visible end is ribbed.

17. The light pipe structure of claim 11, wherein at least a point of said at least one angled surface is disposed in alignment with said light pipe body.

18. A luminaire configured for pipe lighting, the luminaire comprising:

a luminaire housing defining at least one light aperture and a light pipe aperture;

at least one light source disposed in said luminaire housing;

a light pipe structure at least partially disposed in an interior of said housing and extending to said light pipe aperture in a manner that renders a visible end of said light pipe structure visible from an exterior of said luminaire housing;

said light pipe structure including a light entry end associated with said visible end via a light pipe body, wherein said light entry end is configured for entrance of light rays emanating from said light source; and a depression disposed in a visible surface of said visible end, said depression being disposed substantially along a major axis of said visible surface.

19. The luminaire of claim 18, wherein light exits said visible surface and said light pipe aperture in a direction substantially perpendicular to light exiting said at least one light aperture.

20. A luminaire configured for pipe lighting, the luminaire comprising:

a luminaire housing defining at least one light aperture and a light pipe aperture;

at least one light source disposed in said luminaire housing;

a light pipe structure at least partially disposed in an interior of said housing and extending to said light pipe aperture in a manner that renders a visible end of said light pipe structure visible from an exterior of said luminaire housing;

said light pipe structure including a light entry end associated with said visible end via a light pipe body, wherein said light entry end is configured for entrance of light rays emanating from said light source; and a visible extension extending from said light pipe body at said visible end; and at least one angled surface disposed at a junction between said light pipe body and said visible end, said at least one angled surface being angled and disposed relative to said light pipe body to reflect at least a portion of said light rays transmitted through light pipe body off of a major axis of said light pipe body and into or in a direction of said visible extension.

21. The luminaire of claim 20, wherein light exits said visible extension and said light pipe aperture in a direction substantially perpendicular to light exiting said at least one light aperture.

* * * * *